US011962965B2

(12) United States Patent
Oh et al.

(10) Patent No.: US 11,962,965 B2
(45) Date of Patent: Apr. 16, 2024

(54) WIRELESS EARBUD HAVING EXTERNAL EAR CONTACT POINT

(71) Applicant: EM-TECH Co., Ltd., Gyeongsangnam-do (KR)

(72) Inventors: Se Gwan Oh, Gyeonggi-do (KR); Bae Nam Kim, Gyeonggi-do (KR); Seung Kiu Jeong, Gyeongsangnam-do (KR)

(73) Assignee: EM-TECH Co., Ltd., Gyeongsangnam-do (KR)

( * ) Notice: Subject to any disclaimer, the term of this patent is extended or adjusted under 35 U.S.C. 154(b) by 205 days.

(21) Appl. No.: 17/096,011

(22) Filed: Nov. 12, 2020

(65) Prior Publication Data

US 2021/0144461 A1 May 13, 2021

(30) Foreign Application Priority Data

Nov. 13, 2019 (KR) .......................... 1020190145109

(51) Int. Cl.
*H04R 25/00* (2006.01)
*H04R 1/10* (2006.01)

(52) U.S. Cl.
CPC ......... *H04R 1/1058* (2013.01); *H04R 1/1016* (2013.01); *H04R 1/105* (2013.01); *H04R 1/1091* (2013.01); *H04R 2460/11* (2013.01)

(58) Field of Classification Search
CPC .......... H04R 1/10; H04R 25/00; H04R 25/02; H04R 1/1066; H04R 1/1016; H04R 5/033; H04R 1/1091
See application file for complete search history.

(56) References Cited

U.S. PATENT DOCUMENTS

2013/0216081 A1 8/2013 Son et al.
2020/0100010 A1* 3/2020 Yang ........................ H04R 1/10
2020/0107099 A1* 4/2020 McIntosh ............. H04R 1/1016

FOREIGN PATENT DOCUMENTS

KR 19980018579 A 6/1998
KR 20120135898 A 12/2012
KR 20190119559 A 10/2019

* cited by examiner

*Primary Examiner* — Amir H Etesam
(74) *Attorney, Agent, or Firm* — Murphy, Bilak & Homiller, PLLC

(57) ABSTRACT

Disclosed is an earbud including a head housing configured for insertion into a user's auricle and having a sound emitting hole, and a stick housing extending downward from the head housing, wherein the stick housing is inclined inward.

20 Claims, 7 Drawing Sheets

WIRELESS EARBUD HAVING EXTERNAL EAR CONTACT POINT

TECHNICAL FIELD

The present disclosure relates to a wireless earbud having an external ear contact point (i.e., having a contact point outside of an ear).

BACKGROUND

Recently, for the convenience of users, a completely wireless earbud that may be used upon being connected to an electronic device by a wireless communication standard such as Bluetooth has been developed.

FIG. 1 is an outer perspective view of a wireless earbud according to the related art, and FIG. 2 is an inner perspective view of a wireless earbud according to the related art. As shown in FIGS. 1 and 2, earbuds 15*a* and 15*b* include an outer housing having an ear interface portion 3 and a support portion 10. The ear interface portion 3 may be formed to at least partially fit within a user's ear and may be open. An aesthetic acoustic mesh 15 may fit on the ear interface portion 3 and allow sound to propagate from an internal speaker to the user's ear. The outer housing may have at least one user input unit 55 that may be used to answer a phone call, pause or mute playback, or perform other functions. The outer housing for the pair of earbuds 15*a* and 15*b* may be formed of a plastic material including, but not limited to, ABS or polycarbonate.

However, the wireless earbud of the related art has a disadvantage in that the support portion 10 does not play a large role in fixing the earbud because the support portion 10 is formed as a linear cylinder as shown in FIG. 3. For most users, only both sides of the interface portion 3 inserted into the user's ear come into contact with the user's ear when used. That is, for most users, the support portion 10 is rarely used for fixing the earbud when used, and thus may be easily separated from the user's ear.

SUMMARY

Therefore, an aspect of the present disclosure provides a wireless earbud in which a support portion is formed to be curved and comes into contact with a user's cheek so that the user and the earbud are in contact with each other in three places.

According to an aspect of the present disclosure, there is provided a wireless earbud having an external ear contact, which includes a speaker and a battery therein and is used upon being connected to an electronic device by a wireless communication standard, including: a head housing inserted into a user's auricle, when worn and having a sound emitting hole on an inner surface thereof; and a stick housing extending downward from the head housing and having a lower end exposed in the air without being connected to any other member than the head housing, when worn, outside the user's ear, wherein the stick housing has a contact point in contact with a user's body outside the user's ear at the lower end, when worn.

In addition, as another example of the present disclosure, the stick housing may be inclined inward.

In addition, as another example of the present disclosure, the stick housing may be inclined forward.

In addition, as another example of the present disclosure, a connection portion of the stick housing and the head housing may have a curved surface.

In addition, as another example of the present disclosure, the stick housing may have a curved surface having a radius of curvature increased downward.

The earbud provided by the present disclosure may further improve wearability of the earbud by increasing the contact points from two to three, and in particular, may reduce fatigue applied to the user's auricle by distributing a weight of the earbud by the third contact point provided at the stick housing.

Those skilled in the art will recognize additional features and advantages upon reading the following detailed description, and upon viewing the accompanying drawings.

DETAILED DESCRIPTION

Hereinafter, the present disclosure will be described in detail with reference to the accompanying drawings.

Figure 1:
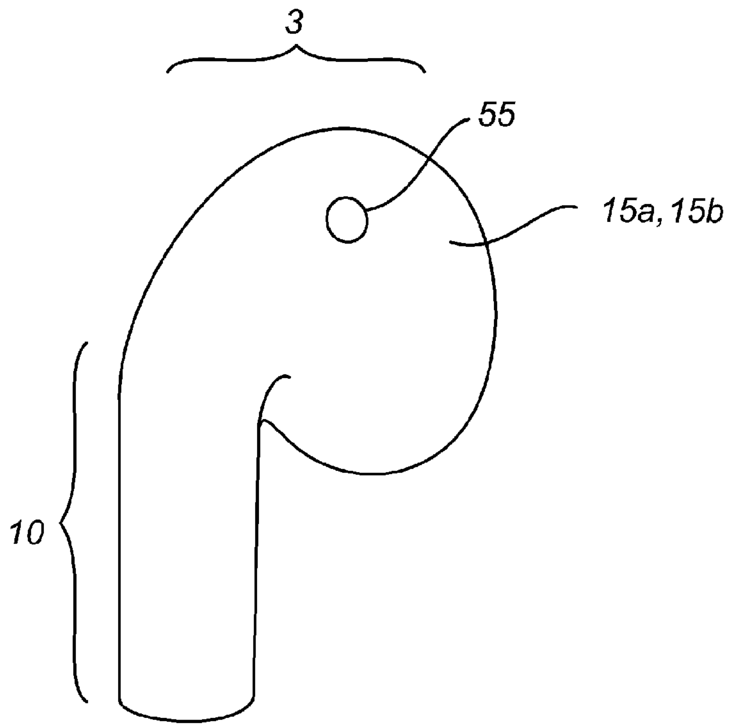
FIG. 1 is an outer perspective view of a wireless earbud according to the related art.
Figure 2:
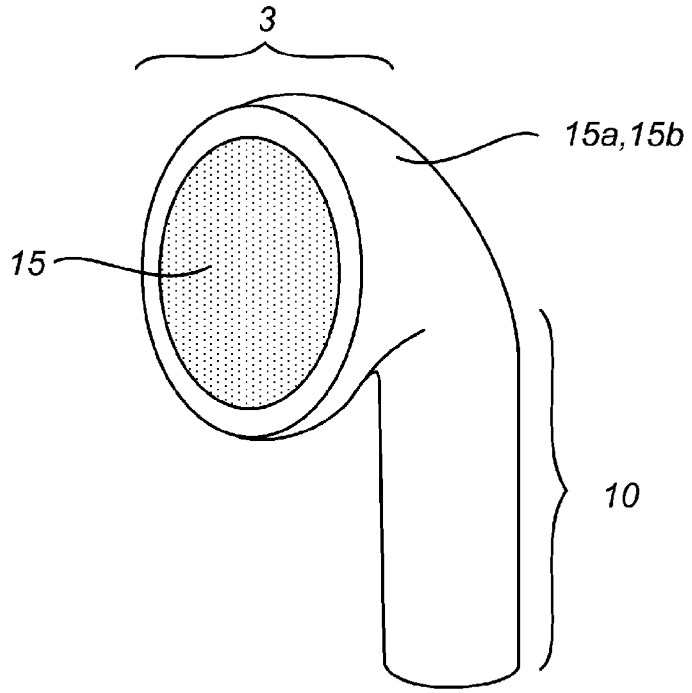
FIG. 2 is an inner perspective view of a wireless earbud according to the related art.
Figure 3:
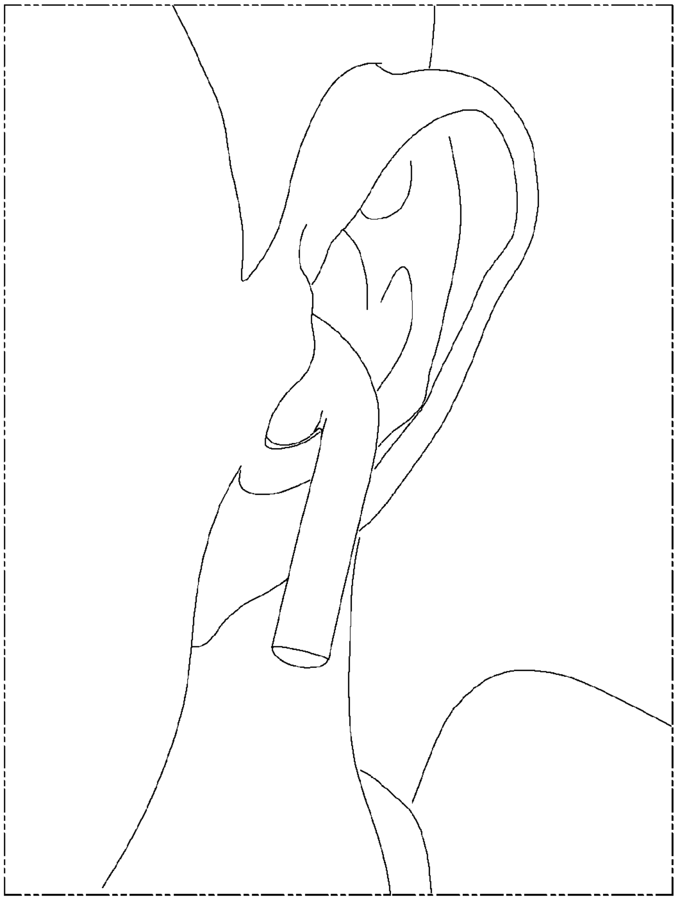
FIG. 3 shows a state of wearing a wireless earbud according to the related art.
Figure 4:
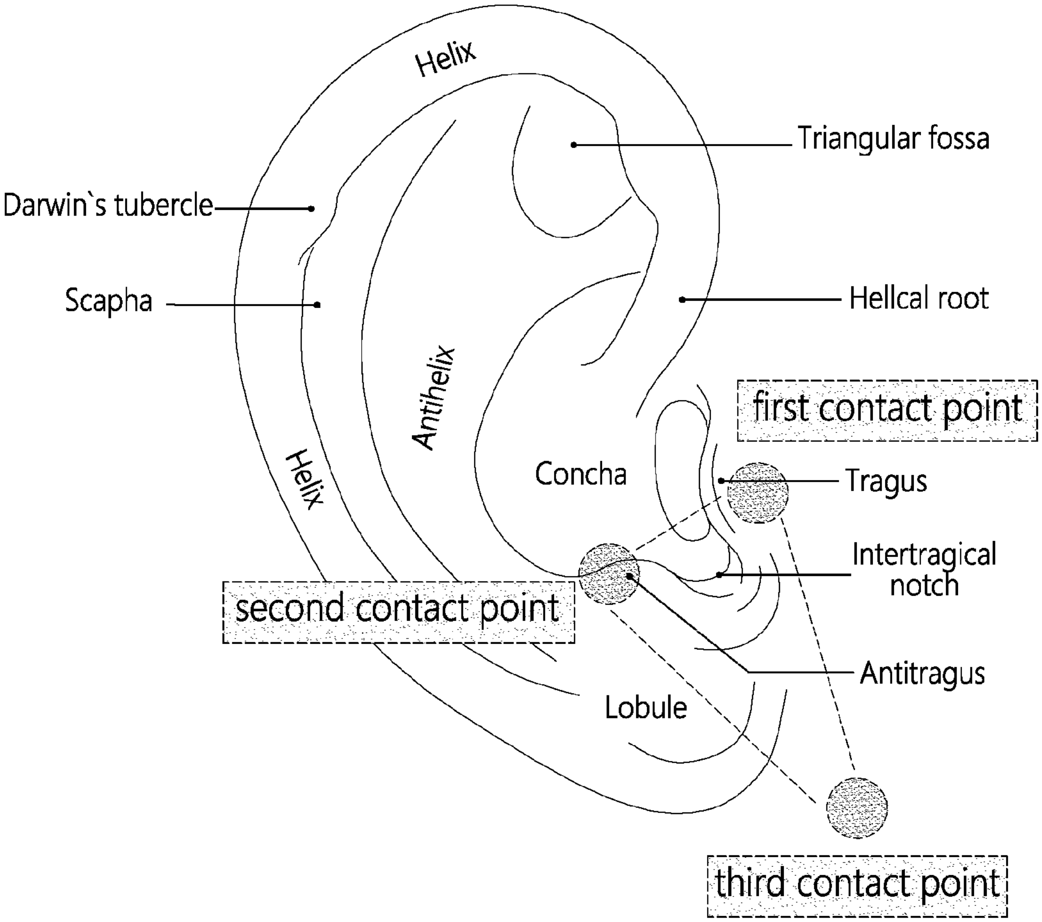
FIG. 4 is a view schematically showing a structure of an ear and contact positions of an earbud according to the present disclosure.

FIG. 4 is a view schematically showing a structure of an ear and contact positions of an earbud according to the present disclosure.

In general, when a head housing of an earbud is inserted into a user's concha of auricle, a front of the head housing comes into contact with a tragus and a rear of the head housing comes into contact with an antitragus. In the present disclosure, in addition to two contact points of the head housing, the stick housing is brought into contact with a temporomandibular joint to form three contact points between the earbud and the user, whereby an end of the stick housing supports the earbud, thus improving wearability.

In the related art, there was a technology that claims to form three contact points between the earbud and the user because the support portion 10 of the earbud is inserted into an intertragical notch of an ear, but strictly speaking, the intertragical notch is a portion between the tragus and the antitragus, which is merely one continuous surface contact, and it may be considered to be difficult to have contact points at separate three places.

In the present disclosure, since the head housing has two contact points within the ear and the stick housing has one contact point outside the ear, stable three contact points may be achieved. Therefore, the three-contact earbud according to the present disclosure may be considered to be a true three-contact earbud.

Figure 5:
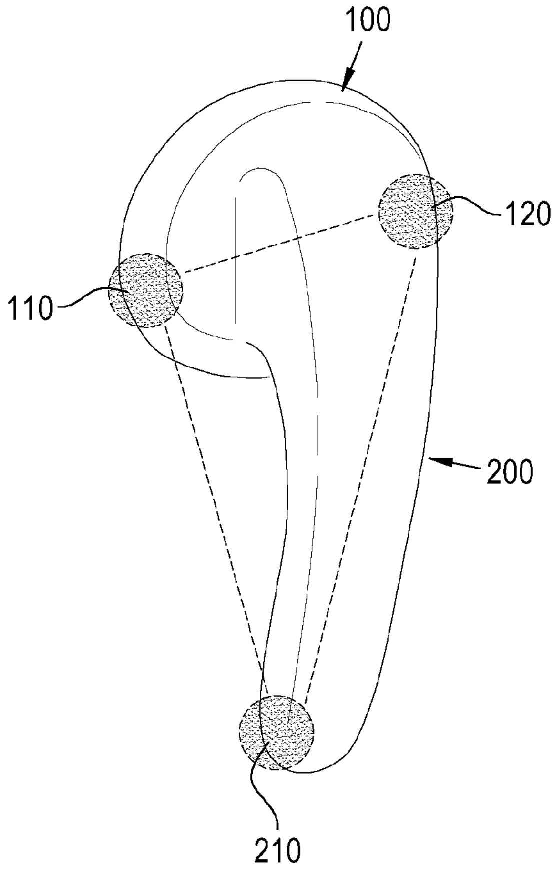
FIG. 5 is an outer perspective view of an earbud according to an embodiment of the present disclosure.
Figure 6:
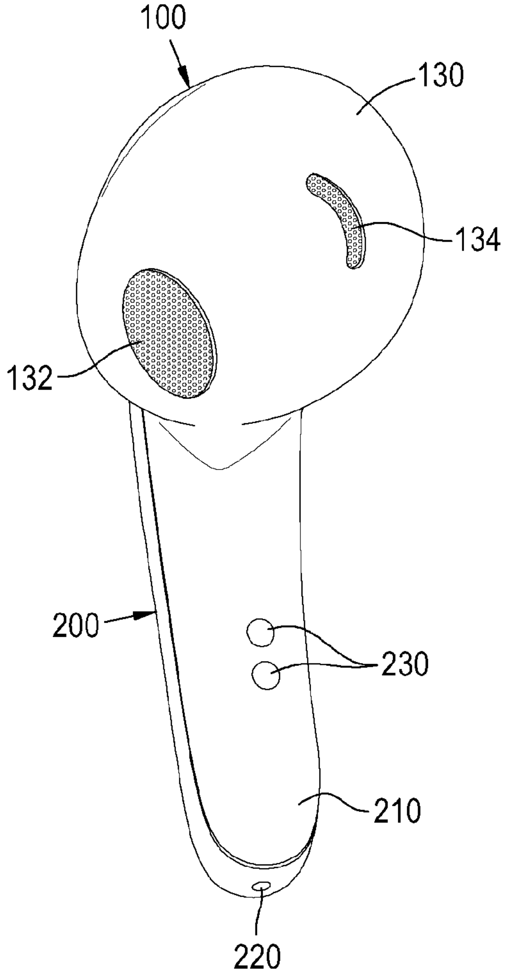
FIG. 6 is an inner perspective view of an earbud according to an embodiment of the present disclosure.

FIG. 5 is an outer perspective view of an earbud according to an embodiment of the present disclosure and FIG. 6 is an inner perspective view of an earbud according to an embodiment of the present disclosure. Hereinafter, a side of the earbud facing the user is referred to as an inner side, and a side of the earbud facing the outside is referred to as an outer side. The earbud according to an embodiment of the present disclosure includes a head housing 100 inserted into an auricle of the user, when worn, and having sound emitting holes 132 and 134 provided on an inner side 130 and a stick housing 200 extending downward from the head housing 100.

A microphone 220 for recognizing a user's voice may be provided at a lower end of the stick housing 200, and in some cases, a charging terminal 230 for charging a battery installed in the stick housing 200 may be provided.

Figure 7:
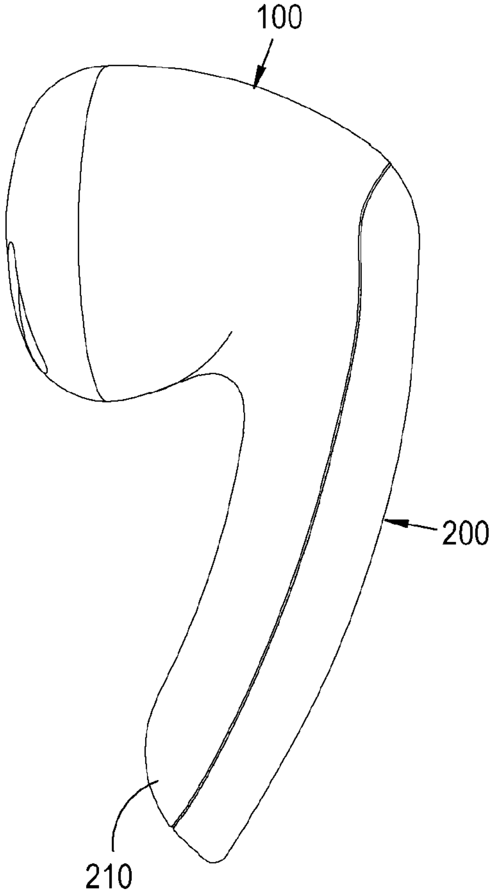
FIG. 7 is a front perspective view of an earbud according to an embodiment of the present disclosure.

FIG. 7 is a front perspective view of an earbud according to an embodiment of the present disclosure.

As described above, the head housing 100 has a front first contact point 110 in contact with a tragus and a rear second contact point 120 in contact with an antitragus. The stick housing 200 extends downward from the head housing 100 and is inclined inward so as to come into contact the user's temporomandibular joint. Here, the stick housing 200 has a shape inclined inward and also inclined forward. Accordingly, the stick housing 200 has a third contact point 210 formed at a lower end of the stick housing 200 to meet the user's temporomandibular joint.

In the present disclosure, since the head housing 100 has two contact points 110 and 120 in the ear and the stick housing 200 has one third contact point 210 outside the ear, thereby achieving stable three contact points. In addition, since the stick housing 200 is in contact with the temporomandibular joint, when a force to press the stick housing 200 to the outside is generated at the third contact point 210 through a kind of lever effect, the head housing 100 is pressed to the ear side, and thus adhesion between the head housing 100 and the auricle may be further increased.

Here, a point where the stick housing 200 and the head housing 100 meet has a smooth curved surface. An inclination of the stick housing 200 inclined toward the inside is largest at a top portion where the stick housing 200 meets the head housing 100, and the inclination gradually decreases toward a bottom. That is, the curved surface formed by the stick housing 200 has the smallest radius of curvature at the top where the stick housing 200 meets the head housing 100, and the radius of curvature increases toward the bottom.

In addition, the stick housing 200 is also inclined forward, and a front slope is also the largest at the top and the slope gradually decreases toward the bottom. That is, a radius of curvature of the curved surface formed as the stick housing 200 is curved forward is the smallest at the top and increases toward the bottom.

As described above, since the stick housing 200 has a curved shape rather than a linear shape, the lower portion of the stick housing 200 stably comes into contact with the user's temporomandibular joint, and the earbud has three contact points in contact with the user. Since the contact points are increased from two to three, compared to the related art, wearability of the earbud may be further improved, and in particular, the third contact point 210 provided in the stick housing 200 distributes a weight of the earbud, thereby alleviating fatigue applied to the user's auricle.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A wireless earbud having an external ear contact point, which includes a speaker and a battery therein and is used upon being connected to an electronic device by a wireless communication standard, the wireless earbud comprising:

a head housing configured for insertion into a user's auricle when worn and having a sound emitting hole on an inner surface thereof; and a stick housing extending downward from the head housing and having a lower end exposed in the air without being connected to any other member than the head housing, when worn, outside the user's ear, wherein the stick housing has a contact point in contact with a user's body outside the user's ear at the lower end, when worn.

2. The wireless earbud of claim 1, wherein the stick housing is inclined inward.

3. The wireless earbud of claim 2, wherein a connection portion of the stick housing and the head housing has a curved surface.

4. The wireless earbud of claim 3, wherein the stick housing has a curved surface having a radius of curvature increased downward.

5. The wireless earbud of claim 4, wherein the stick housing has a contact point in contact with a user's temporomandibular joint at the lower end thereof, when worn.

6. The wireless earbud of claim 3, wherein the stick housing has a contact point in contact with a user's temporomandibular joint at the lower end thereof, when worn.

7. The wireless earbud of claim 3, wherein the head housing has a front first contact point in contact with a tragus and a rear second contact point in contact with an antitragus, when worn.

8. The wireless earbud of claim 2, wherein the stick housing has a contact point in contact with a user's temporomandibular joint at the lower end thereof, when worn.

9. The wireless earbud of claim 2, wherein the head housing has a front first contact point in contact with a tragus and a rear second contact point in contact with an antitragus, when worn.

10. The wireless earbud of claim 1, wherein the stick housing is inclined forward.

11. The wireless earbud of claim 10, wherein a connection portion of the stick housing and the head housing has a curved surface.

12. The wireless earbud of claim 11, wherein the stick housing has a curved surface having a radius of curvature increased downward.

13. The wireless earbud of claim 12, wherein the stick housing has a contact point in contact with a user's temporomandibular joint at the lower end thereof, when worn.

14. The wireless earbud of claim 12, wherein the head housing has a front first contact point in contact with a tragus and a rear second contact point in contact with an antitragus, when worn.

15. The wireless earbud of claim 11, wherein the stick housing has a contact point in contact with a user's temporomandibular joint at the lower end thereof, when worn.

16. The wireless earbud of claim 11, wherein the head housing has a front first contact point in contact with a tragus and a rear second contact point in contact with an antitragus, when worn.

17. The wireless earbud of claim 10, wherein the stick housing has a contact point in contact with a user's temporomandibular joint at the lower end thereof, when worn.

18. The wireless earbud of claim 10, wherein the head housing has a front first contact point in contact with a tragus and a rear second contact point in contact with an antitragus, when worn.

19. The wireless earbud of claim 1, wherein the stick housing has a contact point in contact with a user's temporomandibular joint at the lower end thereof, when worn.

20. The wireless earbud of claim 1, wherein the head housing has a front first contact point in contact with a tragus and a rear second contact point in contact with an antitragus, when worn.

* * * * *